C. Buss,
Lathe Dog.
No. 108,325.    Patented Oct. 18. 1870.
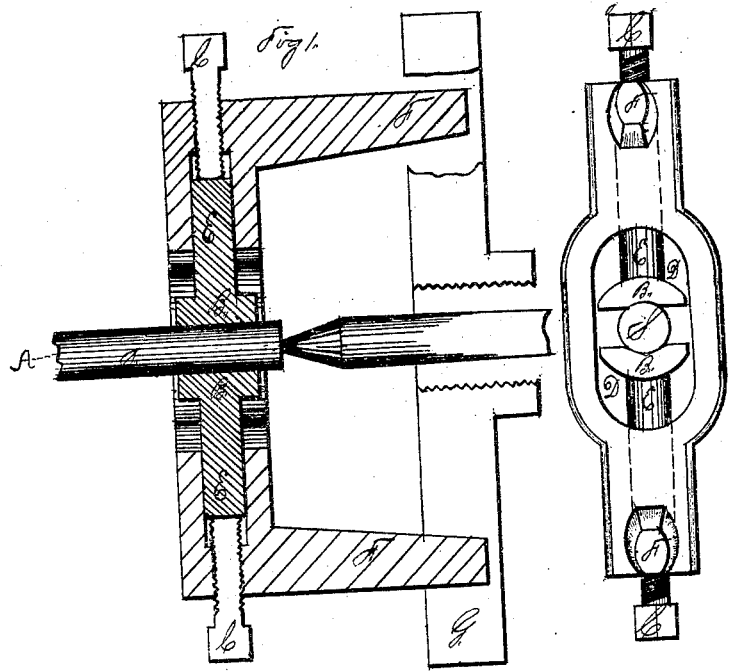
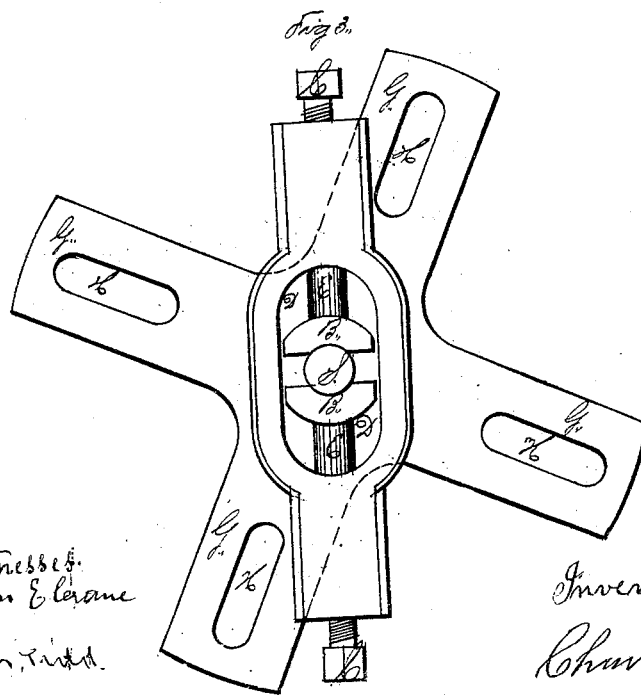
Witnesses:
John E. Crane
M. M. Tidd
Inventor
Charles Buss

United States Patent Office.

CHARLES BUSS, OF MARLBOROUGH, NEW HAMPSHIRE.

Letters Patent No. 108,325, dated October 18, 1870.

IMPROVEMENT IN LATHE-DOGS.

The Schedule referred to in these Letters Patent and making part of the same.

*To all whom it may concern:*

Be it known that I, CHARLES BUSS, of Marlborough, in the county of Cheshire and State of New Hampshire, have invented certain new and useful Improvements in Lathe-Dogs, of which the following is a full, clear, and exact description, reference being had to the accompanying drawing making part of this specification, in which—

Figure 1 is a sectional elevation, and

Figure 2, an end view, each as applied to a shaft, S, and the former as it appears with the shaft on a center, and the dog engaged with the horns of the chuck-plate of a lathe.

Figure 3 is an end view of fig. 1, taken in the direction indicated by the arrow A.

This invention relates to lathe-dogs which are double, or both ends alike, whereby they are more perfectly balanced, and therefore better adapted for use when turning or revolving a shaft at a high velocity, for the purpose of polishing, or of rapid turning, where any throw or centrifugal action of an unbalanced dog would injuriously affect the process, and prevent perfect turning.

This invention also relates to the removable and adjustable sliding jaws or saddles B, each provided with a shank, E, and arranged to press and hold the shaft S, being forced forward by set-screws C passing through the ends of the dog, as clearly shown in the drawing.

An elongated central aperture, D, in the main portion of the dog, provides for the ready application, adjustment, and removal of either of the shanked saddles, or for moving them after turning back the set-screws, and for inserting a shaft between the jambs.

A horn or brace, F, projects from each end of the main portion, at or near a right angle with the face of the latter; and these braces are intended to engage with the horns G of the chuck-plate of a lathe, each brace with an opposite horn, and either at the sides, or inserted through the slots H, and thus be more perfectly balanced than the common lathe-dog, besides holding square on the shaft by the uniform bearing action of the opposite braces, doubling the leverage and the purchase, like an auger-handle, extending two ways from the center, and diminishing or preventing the liability to breakage or injury by torsional action exerted by the rapidly-revolving chuck-plate; and, when the turning-instrument or the polishing-material is presented to the periphery or other surface of the rotating shaft, or other article being turned or finished, or otherwise operated upon, and if the dog should twist or slip, the saddles will remain in their perfectly-fitting positions on the shaft S, since the dog may be moved by the torsional action without disturbing the saddles, as their shanks may turn in their sockets, and, by these means, this dog will adjust itself to any common inequality in the horns of the chuck, and find the uniform bearing.

I claim as my invention—

The double lathe-dog described, provided with opposite braces F, an elongated central aperture, D, and opposite jaws or saddles B, having each a shank, E, arranged as specified, and adjustable by set-screws, to press and hold the shaft, substantially in the manner and for the purpose set forth.

CHARLES BUSS.

Witnesses:
 JOHN W. CONVERSE,
 NELSON CONVERSE.